United States Patent [19]
Greaney

[11] 3,766,388

[45] Oct. 16, 1973

[54] RADIOACTIVE TRACER METHOD AND APPARATUS FOR BOREHOLES

[75] Inventor: John E. Greaney, Houston, Tex.

[73] Assignee: General Nuclear, Inc., Houston, Tex.

[22] Filed: June 4, 1971

[21] Appl. No.: 149,957

[52] U.S. Cl. ............................................. 250/266
[51] Int. Cl. ............................................ H01n 37/00
[58] Field of Search .................. 250/106 T, 83.6 W, 250/44, 45

[56] References Cited
UNITED STATES PATENTS

| | | | |
|---|---|---|---|
| 3,123,708 | 3/1964 | Limanek | 250/106 L |
| 3,010,023 | 11/1961 | Egan et al. | 250/106 L |
| 2,385,378 | 9/1945 | Piety | 250/106 L |
| R27,272 | 11/1972 | Young | 250/106 L |
| 3,369,121 | 2/1968 | Bruno et al. | 250/106 T |
| 2,835,699 | 5/1958 | Fries | 250/106 T |
| 2,617,941 | 11/1952 | Craggs | 250/83.6 W |

Primary Examiner—James W. Lawrence
Assistant Examiner—Harold A. Dixon
Attorney—Fidler & Bard

[57] ABSTRACT

Improved well-logging apparatus is provided which employs a long-lived radioactive material for tracing the flow path of fluid traveling in a subterranean borehole. The radioactive source is a porous capsule containing a long-lived parent isotope in a granule form incapable of permeating the wall of the capsule, but producing non-granulated daughter product having a short half-life. A flush of solvent is passed through the capsule and into the borehole to dissolve away the daughter product and to redeposit it in the borehole. Hence, the long-lived parent isotope is kept from contaminating the borehole, and only the short-lived daughter product is used which disappears in a relatively short interval.

10 Claims, 2 Drawing Figures

PATENTED OCT 16 1973 3,766,388

John E. Greaney
INVENTOR

BY FIDLER & BARD

ATTORNEYS

RADIOACTIVE TRACER METHOD AND APPARATUS FOR BOREHOLES

BACKGROUND OF INVENTION

This invention relates to methods and apparatus employing radioactive tracers and the like and, more particularly, relates to methods and apparatus for providing and using short-lived radioactive tracers in remote or otherwise relatively inaccessible environments. A specific embodiment of this invention includes novel methods and apparatus for supplying and using short-lived radioactive tracer material in a borehole adjacent a subsurface earth formation.

It is well known to employ an unstable isotope as a tracer material, and it is also well known to employ such a tracer for investigative purposes in remote or inaccessible locations. For example, it is old to inject a "slug" of radioactive tracer into a flowing stream, and thereafter to determine the route and/or flow velocity of the stream by sensing radiation emitted by the tracer. It is also old to determine the permeability and limits (perhaps) of an underground reservoir by injecting a radioactive slug into one of the wells tapping the reservoir, and thereafter to detect the arrival of at least a portion of the slug at or adjacent another of such wells.

Although these and other similar techniques have long been used to advantage by many industries besides the petroleum industry, there are also certain disadvantages to such use which have not been overcome by the methods and apparatus of the prior art. For example, it will be apparent that the tracer material will become widely diffused when it is released in a well, and that it is generally impossible to thereafter recover it. Accordingly, once a tracer material has been released in a well, the well and all permeable earth adjacent to the well will become contaminated by the radioactivity emitted by such tracer material. If the tracer material enters a fresh water zone, this zone or formation can no longer be used to supply drinking water. Even if the tracer is diffused only in oil-bearing zones or the like, the radioactivity from the tracer will completely dominate and mask the radiation which is naturally present in certain earth formations and which is measured to provide lithological information. Thus, once a tracer has been injected into a well, no other radioactivity measurements may be taken in that well until the tracer isotope has decayed to its stable state.

It has been proposed to employ only tracer material which has a relatively short half-life, and it is a fact that certain isotopes are available in commercial quantities which have half-lives of an hour or less. Unfortunately, it is seldom that a tracer can be employed immediately after it is "generated," and instead it is usual that the tracer must be stored for hours and even days before it is used. Thus, only a tracer which has a relatively long half-life is practical under most circumstances wherein the methods and apparatus of the prior art are employed.

These disadvantages of the prior art are overcome with the present invention, however, and novel methods and apparatus are provided herein for deriving a short-lived tracer from a long-lived unstable isotope, and for performing such derivation preferably in situ where the tracer is to be employed.

SUMMARY OF INVENTION

In its broadest scope, the present invention involves the use of a quantity of a relatively long-lived radioactive material to provide, as and when needed, an amount of radioactive material which is relatively short-lived and which is accordingly suitable for use as a tracer material. In other words, an unstable isotope is used which is itself relatively long-lived, but which decays to a radioactive daughter product having a relatively short half-life. Accordingly, means is provided by which the long-lived parent isotope may be disposed at or adjacent the site where the tracer is to be released, and whereby selected amounts of the short-lived daughter product may be stripped away and released without permitting any of such parent isotope to escape.

A feature of the present invention is the use of a parent isotope which has a half-life which is long enough to permit a requisite amount of such isotope to be stored for a reasonable length of time prior to being used.

Another feature of the present invention is the use of a parent isotope which decays to a daughter product having a half-life which is short enough to avoid polluting an environment for an inordinate length of time.

These and other features and advantages of the present invention will become apparent from the following detailed description, wherein reference is made to the figures of the accompanying drawing.

IN THE DRAWINGS

DETAILED DESCRIPTION

Figure 1:
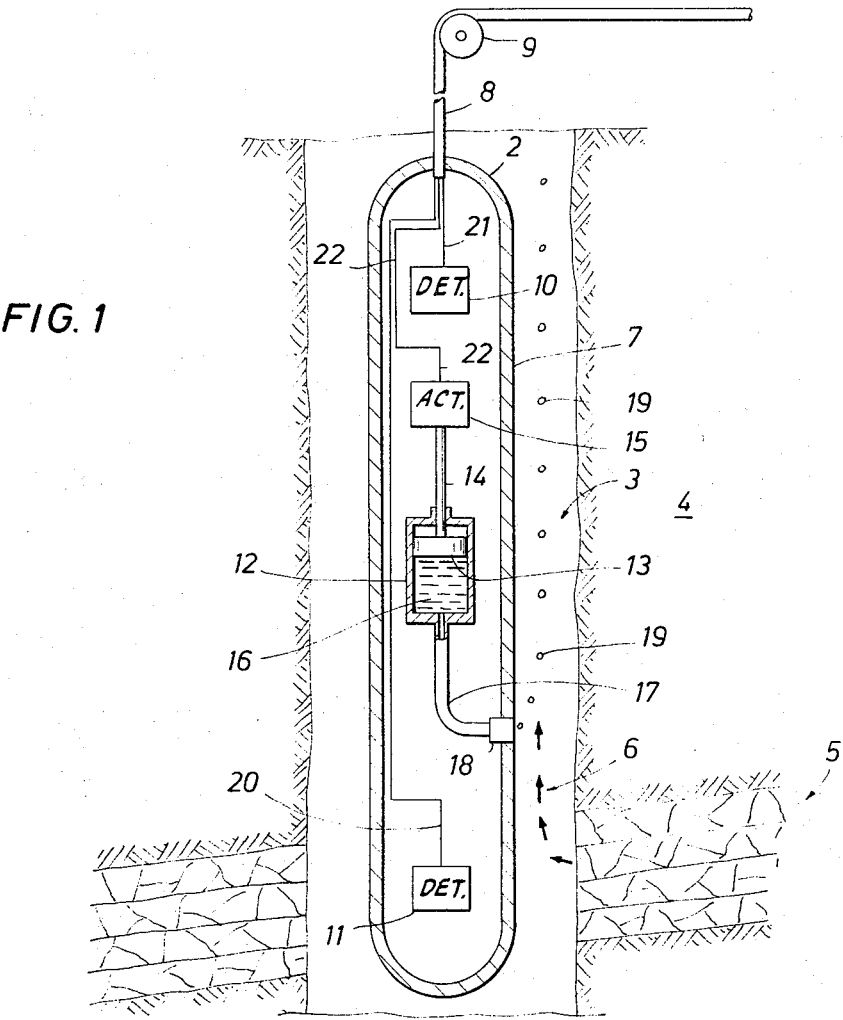
FIG. 1 is a simplified pictorial representation, partly in cross section, of one form of apparatus suitable for performing all of the features of the present invention.

Referring now to FIG. 1, there may be seen a simplified functional representation of apparatus adapted to release radioactive tracer material in an oil well or the like for the purpose of determining the path or direction of a fluid flowing therein. More particularly, there may be seen a cross sectional representation of a borehole 3 which has been drilled downwardly into the earth 4 to traverse or tap a selected subsurface earth formation 5 of interest. Accordingly, a logging instrument 2 may be suspended in the borehole 3 at the lower end of a logging cable 8 or the like and may be composed of a pressure-tight elongate housing 7 containing upper and lower radiation detectors 10 and 11. The cable 8 may be suspended from a sheave wheel 9 which, in turn, may be supported above the borehole 3 by any suitable means such as derrick (not depicted).

Referring again to FIG. 1, the housing 7 may be seen to contain upper and lower radiation detectors 10 and 11 which are mounted on opposite sides of a reservoir 12. An actuator 15 is coupled to the upper end of a shaft 14 having a piston 13 located at its lower end and positioned within the reservoir 12. A conduit 17 is preferably coupled between the lower end of the reservoir 12 and a suitable tracer source 18. The tracer source 18 is coupled to the sidewall of the housing 7, preferably at a location substantially equidistant between the upper and lower radiation detectors 10 and 11.

As will hereinafter be explained in detail with respect to FIG. 2, the tracer source 18 is preferably adapted to support an isotope which has a relatively long half-life but which also decays to produce a daughter product having a relatively short half-life. The reservoir 12 is filled with a suitable solvent 16 which is capable of picking up the daughter product but not the parent isotope. Accordingly, whenever the actuator 15 is appropriately energized by means of a signal in the conductor 22, the piston 13 is driven downwardly through the reservoir 12 a distance such as to drive a predetermined amount of solvent 16 through the tracer source 18 and into the borehole 3. When this occurs, the injected solvent 16 will carry with it into the borehole 3 the amount of daughter product which has previously been accumulated in the tracer source 18 by decay of the primary isotope. The actuator 15 may be cyclically or repeatedly energized by signals sent to the conductor 22 by way of the logging cable 8, whereby an appropriate series of "slugs" of radiation tracer 19 may be injected into the borehole 3.

It may be assumed for purposes of explanation herein that the subsurface formation 5 contains a fluid and that the pressure within the formation 5 is greater than the pressure within the borehole 3. Accordingly, fluid will issue into the borehole 3 from the formation 5 and will travel in one direction or another through the borehole 3.

The fluid from the formation 5 will also carry with it the slugs of radiation 19, and, as these slugs travel past one or the other of the two detectors 10 and 11, the affected detector will provide a suitable electrical indication thereof which is transmitted to the surface of the earth by way of the logging cable 8. In other words, if the fluid from the formation 5 travels upwardly through the borehole 3 as indicated by the heavy black arrows 6, the detector 10 will transmit an appropriate signal to the cable, and thereafter to the surface of the earth, by way of lead 21. If the fluid from the formation 5 travels downwardly through the borehole 3, however, the lower detector 11 will transmit this information to the surface by way of lead 20. It will thus be apparent that the cable 8 may be drawn in or payed out so as to position the instrument 2 in an appropriate location in the borehole 3. Whenever the instrument 2 is properly positioned so that the tracer 19 energizes one of the two detectors 10 and 11 but not the other, this will effectively indicate the location of the formation 5.

Figure 2:
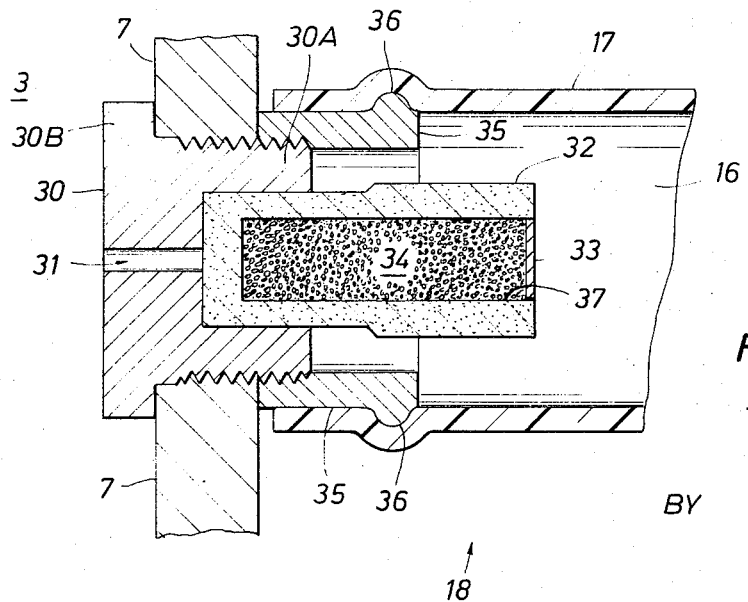
FIG. 2 is a simplified pictorial representation of a portion of the apparatus depicted in FIG. 1 and, more particularly, depicting the portion wherein the daughter product is stripped from the parent isotope without releasing any of such parent isotope into the surrounding area.

Referring now to FIG. 2, there may be seen a more detailed representation of the tracer source 18 indicated in FIG. 1.

Referring now to FIG. 2, there may be seen a simplified pictorial representation of the functional details of the tracer source 18 which is preferably an eduction of isotope separation device, and which is only generally illustrated in FIG. 1. Specifically, the source 18 or isotope separation device may therefore may be composed of a metal fitting 30 having one end formed in the manner of a cup 30A and having its other end provided with a shoulder portion or flange 30B at the other end to limit the distance the fitting 30 map be screwed into the housing 7. Accordingly, the fitting 30 is preferably provided with a small diameter passageway or orifice 31 centrally located in and extending through the end having the flange 30B to communicate with the cup 30A.

As further indicated in FIG. 2, a hollow body or "frit" 32 is also provided which is preferably formed of porous stainless steel or the like. The frit 32 may be generally cylindrical in shape, with one end closed and with the other end open, to give the frit 32 a cup-like configuration. As further indicated, the open end of the frit 32 is preferably stoppered shut with a removable disc-like plug 33, which may conveniently be formed of non-porous stainless steel or the like. Accordingly, the closed but porous end of the frit 32 is preferably fixedly inserted into the cup end 30A of the fitting 30.

As illustrated in FIG. 2, the fitting 30 is preferably inserted in a threaded hole in the wall of the housing 7, whereby the orifice 31 provides a path of communication between the borehole 6 and the interior of the instrument 2. More particularly, the flange 30B of the fitting 30 is disposed outside of the housing 7 and in the borehole 3, whereby the cup 30A of the fitting 30 is located within the housing 7 to shelter the frit 32 within the instrument 2. What is more to the point, however, is that the borehole 6 and surrounding earth 4 are shielded from the frit 32 and its contents, except under controlled conditions.

Referring again to FIG. 1, it will be noted that the tracer source 18 is coupled to the discharge end of the reservoir 12 by means of a tubing 17. The tubing 17, of course, may be any suitable kind of conduit and, as indicated in FIG. 2, may be a flexible hose 17 formed of any suitable substance which does not interact with the solvent 16 in the reservoir 12. Accordingly, the hose 17 formed of an elastomer may conveniently be coupled to the source 18 by means of an internally threaded nipple 35, which may be screwed onto the cup end 30A of the fitting 30, and which may be provided with an external ridge or lip 36 for the expanded end of the hose 17 which is inserted over the projecting nipple 35. It will thus be seen that the arrangement depicted in FIG. 2 provides for a maximum amount of the external surface of the frit 32 to be immersed in the solvent 16 which is flowing within the hose 17 from the reservoir 12.

As hereinbefore stated, the frit 32 is hollow. In an especially suitable embodiment of the present invention, the interior space in the frit 32 is preferably filled with granules of a suitable cation exchange resin 34 which has been saturated or impregnated with a solution of a suitable unstable isotope having those characteristics which are desirable for purposes of this invention. In particular, the granules of resin 34 are preferably packed into the frit 32 and are thereafter impregnated or saturated with a solution of a selected radioactive material before the plug 33 is inserted into the open end of the frit 32.

The particular unstable isotope solution which is selected to impregnate the resin 34 is preferably one wherein the isotope has a relatively long half-life, so that it is unnecessary for the plug 33 to be removed and the frit 32 to be opened, except only after the expiration of a relatively long period of time. On the other hand, it is also preferably that the isotope which is selected is itself capable of entering into an ion exchange relationship with the resin 34 in the frit 32, but that the daughter product which is produced by decay of the parent isotope is incapable of such a relationship with the resin 34. Finally, it is preferable that the daughter product have a half-life which is relatively short.

An unstable isotope which has been found especially suitable for purposes of the present invention is cesium-137. This isotope itself has a half-life of approximately 30 years. However, cesium-137 produces the daughter product barium-137M which, in turn, has a half-life of only aobut 2.6 minutes. Any cation exchange material or "resin" 34 which will combine with cesium-137 will be suitable for purposes of the present invention. A "resin" which has been found especially suitable, however, is the zirconium phosphate "resin" which is presently manufactured and sold by Bio-Rad Laboratories, of Richmond, California, under the trademark ZP-1.

Although the long-lived parent isotope is to be prevented from entering the borehole 6 and thereby contaminating the formation 5 or other portions of the surrounding earth 4, it is also the purpose of the present invention to draw the short-lived daughter product out of the frit 32 and to discharge it through the orifice 31 into the borehole 3. Accordingly, the reservoir 12 is preferably filled with an adequate amount of a liquid solvent 16 capable of permeating the walls of the frit 32 and dissolving the daugther product accumulated therein, but which is also incapable of also dissolving or otherwise damaging either the frit 32 or the resin 34 contained therein. Hydrochloric acid has been found to be an effective agent for penetrating the porous wall of the frit 32 without damaging either the frit 32 or the resin 34 and cesium-137 therein, but which can also effectively dissolve the daughter product which has accumulated therein.

As hereinbefore stated, the wall portion of the frit 32 is sufficiently porous so as to be capable of being permeated by whatever acid or other reagent has been selected as the solvent 16. However, it is essential that the frit 32 be impervious to the granules of resin 34, whereby a flush of solvent 16 through the hose 17 to and through the porous wall of the frit 32 will not carry away any of the granules of resin 34 in the frit 32. It has been found especially suitable for purposes of the present invention to provide a frit 32 having a wall porosity such that it is permeable only by particles of material of seven microns size or smaller. Accordingly, the aforementioned "ZP-1" resin which is sold by Bio-Rad Laboratories is especially suitable for this purpose since it has a "mesh" of about 50-100 microns in particle size.

Referring now to the apparatus in general, it will be noted that the instrument may be disposed in the borehole 3 at any convenient location or depth, but preferably at a depth such that the fluid flow 6 will travel past the exterior surface of the housing 7. Thus, a command signal may be generated at the surface of the earth 4 by any of several well known techniques, but preferably in electrical form whereby the signal may be conducted down the actuator conductor 22, in the cable 8, to the actuator 15 which is coupled to the piston 13 by means of the shaft 14.

When energized, the actuator 15 may conveniently be arranged to drive or cause the piston 13 to be preferably shifted in the cylindrical reservoir 12 only far enough to expel an amount of solvent 16 from the reservoir 12 which is sufficient to dissolve a substantial amount of whatever daughter product may have accumulated in the frit 32. In general, therefore, the function of the actuator 15 is to eject a preselected amount of radioactive tracer material from the instrument 2 and into the borehole 3. More particularly, however, the hose 17 is preferably continually filled with solvent 16 throughout its entire length, from the bottom or exit of the reservoir 12 to the cup 30A of the fitting 30. Accordingly, the frit 32 will be seen to be substantially immersed in the HCl or other solvent 16, whereby discharge of a preselected or predetermined amount of solvent 16 from the reservoir 12 will cause a like amount of such solvent 16 to be forced through the porous wall of the frit 32, over the granules of resin 34 therein, through the porous base of the frit 32 and the orifice 31, and into the borehole 3.

As hereinbefore stated, this flush of solvent 16 will, of course, wash all or substantially all of the then accumulated daughter product out of the frit 32 and into the borehole 3. Accordingly, this flush of solvent 16 will result in the deposit of a discrete amount of radioactive tracer material (the daughter product) into the fluid flow 6 where it will be carried either up or down along the exterior of the instrument housing 7, depending on whether the fluid flow 6 which is emanating from the formation 5 is traveling up or down in the borehole 3.

Referring againt to FIG. 1, it may be seen that, for purposes of illustration only, the direction of fluid flow 6 from the formation 5 is in an upward direction in the borehole 3. There may be any one of several reasons for this phenomenon, such as the existence of another formation (not depicted) which is located somewhere above the emitting formation 5 and which has a lower internal pressure than that in the emitting formation 5. In any event, it will usually be imperative that a "lost circulation zone" of such character be cemented off and thereby corrected as soon as its location can be determined with precision. Accordingly, the direction of such fluid flow 6 will preferably be determined as hereinbefore described. Next, the instrument 2 may be raised a predetermined increment of distance along the borehole 3, and the actuator 15 may again be energized to shift the piston 13 a further distance downward in the cylindrical reservoir 12, and to thereby eject another slug of radioactive daughter product from the frit 32. If the upper radiation detector 10 subsequently transmits a signal to the surface by way of the lead 21 and cable 8, the receiving or low-pressure formation (not depicted) may be assumed to be located somewhere further up above the detector 10, and the instrument 2 can then be lifted another increment of distance and the process repeated. If the detector 10 fails to respond to radiation which can be fairly attributed to a "slug" of daughter product, however, then the low-pressure formation may be presumed to be located somewhere between the fitting 30 and the detector 10. The precise location may, of course, be determined by merely shifting the instrument 2 through small distances either up or down, and by thereafter actuating the tracer source 18 as hereinbefore described.

It will be noted that if the so-called "low-pressure" formation is located below the emitting formation 5, the direction of the fluid flow 6 in the borehole 3 will be downward in the borehole 3 instead of upward as hereinbefore explained. Accordingly, it is the lower detector 11 which will produce the response when the slug of radioactive daughter product is carried past it, and this response will be an appropriate electrical signal which may be transmitted to the surface of the earth 4 by lead 20 in the logging cable 8.

It may be necessary to locate the emitting formation 5 as well as the so-called low-pressure formation (not depicted). This may be done as hereinbefore described, of course.

It should be noted that the amount of daughter product which the depicted apparatus can eject into the borehole 3 is determined by the size of the frit 32, the half-life of the primary isotope (the cesium–137), and the amount of solvent 16 which is available in the cylindrical reservoir 12, of course. It should be especially noted, however, that the actuator 15 is preferably designed so as to eject at least enough solvent 16 so that each such ejection will effectively carry away all of the daughter product which has been accumulated in the frit 32. Thus, the frequency with which the actuator 15 can be re-energized will depend on the time required for another accumulation of daughter product to have been developed, and this time period will be equal to substantially three times the half-life of the daughter product. In other words, since the half-life of barium–137M is on the order of 2.6 minutes, a second ejection of the daughter product of cesium–137 can be made after only about 6–8 minutes.

It will thus be apparent that the parent isotope which is selected is preferably not only one having as long a half-life as possible, but which is also one that produces a daughter product having as short a half-life as possible. Accordingly, other parent isotopes may be selected besides cesium–137. For example, strontium–90 which has a half-life of 28 years may be suitable. Moreover, Germanium–68 having a half-life of 275 days might be suitable, and cesium–144 with a 285–day half-life may be employed for purposes of the present invention.

It will be apparent from the foregoing that many other variations and modifications may be made in the structures and methods described herein without substantially departing from the basic concept of the present invention. Accordingly, it should be clearly understood that the forms of the invention described herein and depicted in the accompanying drawings are exemplary only and are not intended as limitations in the scope of the present invention.

What is claimed is:

1. A system for tracing fluid flow in a subterranean borehole or the like, comprising
   an elongate housing means adapted to be passed through said borehole,
   a first radiation detector disposed in one end of said housing,
   a second radiation detector disposed in the other end of said housing, and
   isotope separation means within said housing including a long-lived isotope and means for deriving a relatively short-lived radioactive isotope from said relatively long-lived istope and for introducing only said derived short-lived isotope into said borehole at a location generally between said detectors.

2. The system described in claim 1, wherein said isotope separation means is further adapted to isolate said long-lived radioactive material from said borehole.

3. The system described in claim 2, wherein said isotope separation means is further adapted to derive a predetermined quantity of said short-lived radioactive material from said long-lived radioactive material.

4. The system described in claim 3, wherein said long-lived radioactive material, is a quantity of an unstable isotope encapsulated by said isotope separation means and wherein said unstable isotope decays to produce a short-lived radioactive daughter product.

5. The system described in claim 4, wherein said isotope separation means comprises
   a quantity of non-radioactive granulated material capable of entering into ion exchange with said isotope but not with said daughter product,
   a capsule means enclosing said granulated material and having a porous wall portion permeable by said daughter product, and
   rinsing means for discharging a flow of solvent through said capsule means and into said borehole.

6. The system described in claim 5, further comprising signalling means interconnected with said detectors for generating and transmitting information to the surface of the earth relative to fluid movement in said borehole.

7. The system described in claim 6, further comprising actuating means interconnected to energize said rinsing means to discharge a predetermined quantity of said solvent through said capsule means.

8. The system described in claim 7, wherein said unstable isotope is substantially composed of cesium–137, and wherein said solvent is hydrochloric acid.

9. A method of tracing fluid flow in a subterranean borehole, comprising
   establishing in said borehole a quantity of radioactive tracer material composed of an unstable isotope having a relatively long life and decaying to form a quantity of an unstable daughter product having a substantially short half-life,
   isolating said quantity of said isotope from fluids in and from earth materials surrounding said borehole,
   separating said quantity of said daughter product from said isolated quantity of said isotope having a long half-life, and
   releasing said separated quantity of said daughter product into said borehole.

10. The method described in claim 9, including the steps of
    disposing said quantity of unstable isotope in isolation in said borehole for a first time period sufficient to permit a maximum amount of said daughter product to accumulate in combination therewith,
    separating said accumulated amount of daughter product from said quantity of isotope and releasing said separated daughter product into said borehole, and
    after a second time period at least as long as twice the half-life of said daughter product and not greater than three times said half-life thereof separating from said isotope and releasing into said borehole any daughter product accumulated with said isolated isotope.

* * * * *